US012464300B2

(12) United States Patent
von Tessin et al.

(10) Patent No.: US 12,464,300 B2
(45) Date of Patent: Nov. 4, 2025

(54) EXTENDING A HEARING DEVICE WITH A USER INTERFACE DEVICE TO ENABLE AUTHENTICATION

(71) Applicant: SONOVA AG, Staefa (CH)

(72) Inventors: Michael von Tessin, Esslingen (CH); Andreas Breitenmoser, Zurich (CH); Alexander Maksyagin, Ebmatingen (CH)

(73) Assignee: Sonova AG, Staefa (CH)

( * ) Notice: Subject to any disclaimer, the term of this patent is extended or adjusted under 35 U.S.C. 154(b) by 163 days.

(21) Appl. No.: 18/278,505

(22) PCT Filed: Mar. 30, 2021

(86) PCT No.: PCT/IB2021/052658
§ 371 (c)(1),
(2) Date: Aug. 23, 2023

(87) PCT Pub. No.: WO2022/208132
PCT Pub. Date: Oct. 6, 2022

(65) Prior Publication Data
US 2024/0137715 A1 Apr. 25, 2024
US 2024/0236590 A9 Jul. 11, 2024

(51) Int. Cl.
*H04R 25/00* (2006.01)
*H04W 12/06* (2021.01)
(Continued)

(52) U.S. Cl.
CPC .......... *H04R 25/558* (2013.01); *H04W 12/06* (2013.01); *H04W 12/33* (2021.01); *H04W 12/50* (2021.01); *H04R 2225/55* (2013.01)

(58) Field of Classification Search
None
See application file for complete search history.

(56) References Cited

U.S. PATENT DOCUMENTS 9,549,240 B2 1/2017 Sohn et al.
10,313,806 B2 6/2019 Vendelbo
(Continued)

FOREIGN PATENT DOCUMENTS

WO 2018072830 4/2018
WO 2018091079 5/2018

OTHER PUBLICATIONS

International Search Report and Written Opinion mailed Dec. 14, 2021 in corresponding International Application No. PCT/IB2021/052658 with the International Filing Date of Mar. 30, 2021.

*Primary Examiner* — Paul W Huber
(74) *Attorney, Agent, or Firm* — ALG Intellectual Property, LLC

(57) ABSTRACT

An exemplary hearing device includes a memory storing instructions and a processor communicatively coupled to the memory. The processor may be configured to execute the instructions to establish a first pairing relationship between the hearing device and a user interface device, receive, from the user interface device via a communication channel based on the first pairing relationship, user input provided by a user via a user interface of the user interface device, and authenticate, based on the user input, a second pairing relationship between the hearing device and a computing device distinct from the user interface device.

20 Claims, 8 Drawing Sheets

(51) Int. Cl.
*H04W 12/33* (2021.01)
*H04W 12/50* (2021.01)

(56) References Cited

U.S. PATENT DOCUMENTS

| | | |
|---|---|---|
| 10,375,492 B2 | 8/2019 | Gehring et al. |
| 2011/0319018 A1 | 12/2011 | Kroman |
| 2013/0157573 A1 | 6/2013 | Aldaz et al. |
| 2015/0163585 A1* | 6/2015 | Sohn .................. H04R 25/554 |
| | | 381/74 |
| 2016/0316501 A1* | 10/2016 | Roe ...................... H04W 12/50 |
| 2017/0094381 A1 | 3/2017 | Leblanc et al. |
| 2017/0257472 A1 | 9/2017 | Gehring et al. |
| 2018/0167809 A1 | 6/2018 | Vendelbo |
| 2018/0227679 A1 | 8/2018 | Ungstrup et al. |
| 2018/0352433 A1 | 12/2018 | Vendelbo et al. |
| 2019/0082277 A1 | 3/2019 | Vendelbo |
| 2019/0110140 A1 | 4/2019 | Dickmann et al. |
| 2020/0053491 A1* | 2/2020 | Dickmann .......... H04R 25/552 |
| 2020/0120430 A1 | 4/2020 | Perscheid |
| 2020/0313868 A1 | 10/2020 | Vendelbo |

\* cited by examiner

EXTENDING A HEARING DEVICE WITH A USER INTERFACE DEVICE TO ENABLE AUTHENTICATION

BACKGROUND INFORMATION

It is often desirable to wirelessly connect (e.g., via Bluetooth) a hearing device (e.g., a hearing aid configured to provide hearing capability to a user) to a computing device, such as a mobile phone, remote microphone, audio streaming device, etc. In this manner, a user may use the computing device to control, provide audio to, and/or otherwise interact with the hearing device.

To establish such a wireless connection, the hearing device and the computing device are typically required to perform a pairing procedure one with another. If the pairing is done in an unauthenticated manner (e.g., a "just-works" pairing), an attacker (e.g., a man-in-the-middle attacker) present during the pairing procedure could gain unauthorized access to communications between the hearing device and the computing device, thereby gaining access to sensitive user data stored by the hearing device, gaining control over the hearing device to damage the hearing device and/or negatively impact operations of the hearing device (e.g., cause the hearing device to output a loud sound that can damage hearing capability of the user), and/or being able to use the hearing device to eavesdrop on a surrounding environment of the user. Hence, it is often desirable or required for the pairing between a hearing device and a computing device to be authenticated.

An authenticated pairing procedure often requires the user to check equality of numbers that are displayed on both devices (numeric comparison), or to enter a passcode (passkey entry) on one device that is displayed on the other device.

Unfortunately, a hearing device often has a limited user interface. For example, the hearing device may not have a display or keys that can be used to enter a passcode. Hence, it can be difficult or even impossible for some hearing devices to establish authenticated pairings.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
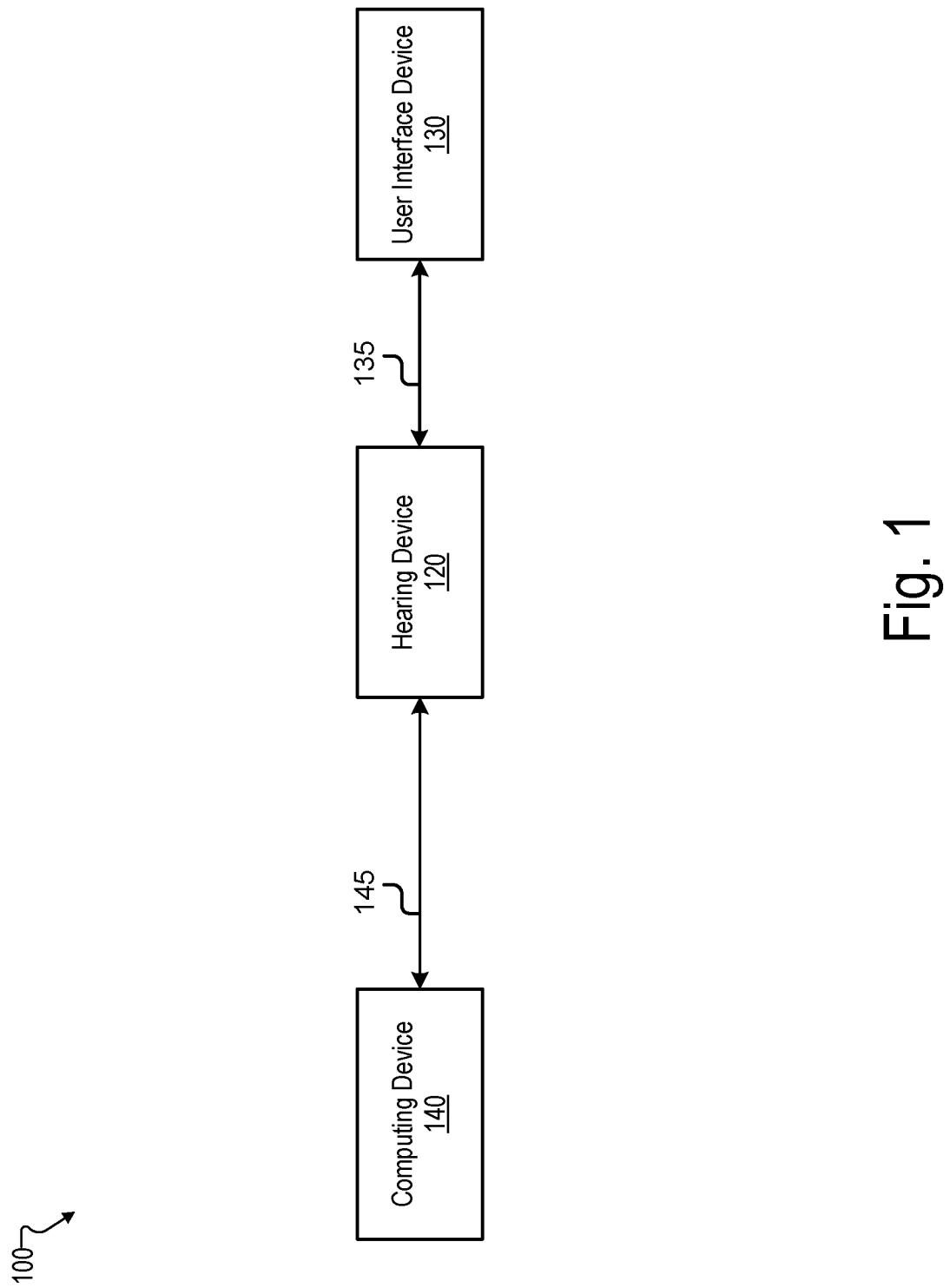
FIG. 1 illustrates an exemplary system.

Systems and methods in which a hearing device is extended with a user interface device to enable authentication and facilitate user interactions with the hearing device are described herein. As will be described in more detail below, an exemplary system may comprise a hearing device and a user interface device. The hearing device may be configured to establish a first pairing relationship between the hearing device and the user interface device, receive, from the user interface device via a communication channel based on the first pairing relationship, user input provided by a user via a user interface of the user interface device, and authenticate, based on the user input, a second pairing relationship between the hearing device and a computing device distinct from the user interface device.

Systems and methods described herein are advantageous in a number of technical respects. For example, the systems and methods may facilitate a user in interacting with a hearing device to authenticate a pairing relationship between the hearing device and a computing device and also facilitate the user in other user interactions with the hearing device. As described herein, as a first pairing relationship is established between the hearing device and the user interface device, a communication channel can be automatically established between the hearing device and the user interface device based on the first pairing relationship. When the hearing device and the user interface device are communicatively coupled to one another via this communication channel, the user interface device may enable the user to interact with the hearing device via the user interface device. For example, the user interface device may receive user input from the user via its input components (e.g., keyboard, touchscreen, etc.) and transmit the user input to the hearing device via the communication channel. Additionally or alternatively, the user interface device may receive output from the hearing device via the communication channel and provide the output to the user via its output components (e.g., display screen, audio speaker, etc.).

Accordingly, the user interface device may operate as an extended user interface for the hearing device when the hearing device and the user interface device are communicatively coupled to one another via the communication channel. As a result, the user may conveniently interact with the hearing device via the user interface of the user interface device even if the hearing device itself has very limited user interface.

Moreover, as described herein, the first pairing relationship between the hearing device and the user interface device may be securely established. For example, the hearing device and the user interface device may establish the first pairing relationship between the hearing device and the user interface device when the hearing device and the user interface device are located proximate to one another. As a result, an attacker (e.g., a man-in-the-middle, a machine-in-the-middle, etc.) would have to be present proximate to the hearing device and the user interface device when the first pairing relationship is established in order to interfere with the first pairing relationship, which presence could easily be detected by the user. This and other ways in which the first pairing relationship between the hearing device and the user interface device may be securely established are described herein.

Because the first pairing relationship between the hearing device and the user interface device is securely established, the communication channel between the hearing device and the user interface device that is based on the first pairing relationship may also be secure. As a result, user input provided by the user and output provided by the hearing device may be securely transmitted between the hearing device and the user interface device via the communication channel, and therefore the user may safely interact with the hearing device via the user interface device. For example, the user may conveniently provide user input via the user interface device to authorize or reject pairing relationships and/or connections between the hearing device and other computing devices. This implementation may also allow the pairing relationships and/or connections between the hearing device and other computing devices to be authenticated, and therefore the hearing device may be effectively protected from potential security attacks caused by connections to malicious computing devices.

Other implementations of the systems and methods are described herein and advantages of these implementations will also be made apparent herein.

FIG. 1 illustrates an exemplary system 100 that includes, without limitation, a hearing device 120, a user interface device 130, and a computing device 140 that is distinct from user interface device 130.

Hearing device 120 may be implemented by any device configured to provide or enhance hearing to a user. For example, hearing device 120 may be implemented by a hearing aid configured to amplify audio content to a user, a sound processor included in a cochlear implant system configured to apply electrical stimulation representative of audio content to a user, a sound processor included in a stimulation system configured to apply electrical and acoustic stimulation to a user, or any other suitable hearing prosthesis or combination of hearing prostheses. In some examples, hearing device 120 may be implemented by a behind-the-ear ("BTE") component configured to be worn behind an ear of a user. Additionally or alternatively, hearing device 120 may be implemented by an in-the-ear ("ITE") component configured to at least partially be inserted within an ear canal of a user. In some examples, hearing device 120 may include a combination of an ITE component, a BTE component, and/or any other suitable component.

User interface device 130 may be implemented by an input/output device that can be communicatively coupled to hearing device 120 to provide input and/or output capabilities for hearing device 120. For example, user interface device 130 may be implemented by a keyboard, a touchscreen, an audio speaker, etc. Alternatively, user interface device 130 may itself be a computing device that include input and/or output components. Thus, user interface device 130 may have capabilities to not only input and/or output data but also to process data. For example, user interface device 130 may be a mobile phone, a tablet, a personal computer, a smart watch, a charging device of hearing device 120, etc. As described herein, user interface device 130 may additionally or alternatively be communicatively coupled to another computing device (e.g., hearing device 120) to provide input and/or output capabilities for the computing device, regardless of whether user interface device 130 is an input/output device or a computing device that includes input/output components.

Computing device 140 may be implemented by any device configured to communicatively interact with hearing device 120. For example, computing device 140 may process various types of data, transmit and receive the data to and from hearing device 120, etc. Non-limiting examples of computing device 140 include, but are not limited to, a mobile phone, a tablet, a laptop, a personal computer, a cloud computing system, etc. Other types of computing device 140 are also possible and contemplated.

In some embodiments, hearing device 120 and user interface device 130 may establish a first pairing relationship 135 between hearing device 120 and user interface device 130.

Once first pairing relationship 135 is formed, hearing device 120 and user interface device 130 may automatically establish a connection between hearing device 120 and user interface device 130 based on first pairing relationship 135 when applicable. For example, when hearing device 120 and user interface device 130 are located within a predefined range from one another (e.g., a distance between hearing device 120 and user interface device 130 is equal to or lower than a predefined distance threshold), hearing device 120 and user interface device 130 may automatically establish a first communication channel between hearing device 120 and user interface device 130 without any user action and/or authentication due to first pairing relationship 135 that was previously established. Hearing device 120 and user interface device 130 may then communicate with one another via the first communication channel that is based on first pairing relationship 135.

In some embodiments, hearing device 120 and user interface device 130 may communicate user input provided by a user and/or output provided by hearing device 120 via the first communication channel established based on first pairing relationship 135. As described in more detail herein, the user input of the user and/or the output of hearing device 120 may be used in establishing a second pairing relationship 145 between hearing device 120 and computing device 140. Similar to first pairing relationship 135, once second pairing relationship 145 is formed, hearing device 120 and computing device 140 may automatically establish a connection between hearing device 120 and computing device 140 based on second pairing relationship 145 when applicable. For example, when hearing device 120 and computing device 140 are located within a communication range from one another (e.g., a distance between hearing device 120 and computing device 140 is equal to or lower than a predefined distance threshold that allows hearing device 120 and computing device 140 to communicate), hearing device 120 and computing device 140 may automatically establish a second communication channel between hearing device 120 and computing device 140 without any user action and/or authentication due to second pairing relationship 145 that was previously established. Hearing device 120 and computing device 140 may then communicate with one another via the second communication channel that is based on second pairing relationship 145.

Additionally or alternatively, hearing device 120 and user interface device 130 may communicate other types of data via the first communication channel established based on first pairing relationship 135. For example, instead of communicating data being used to authenticate second pairing relationship 145 between hearing device 120 and computing device 140 as described above, hearing device 120 and user interface device 130 may communicate, via the first communication channel, data being used to directly authenticate the second communication channel between hearing device 120 and computing device 140. As another example, hearing device 120 and user interface device 130 may communicate, via the first communication channel, data related to user interactions of the user with hearing device 120 that may be used to perform various operations of hearing device 120.

Figure 2:
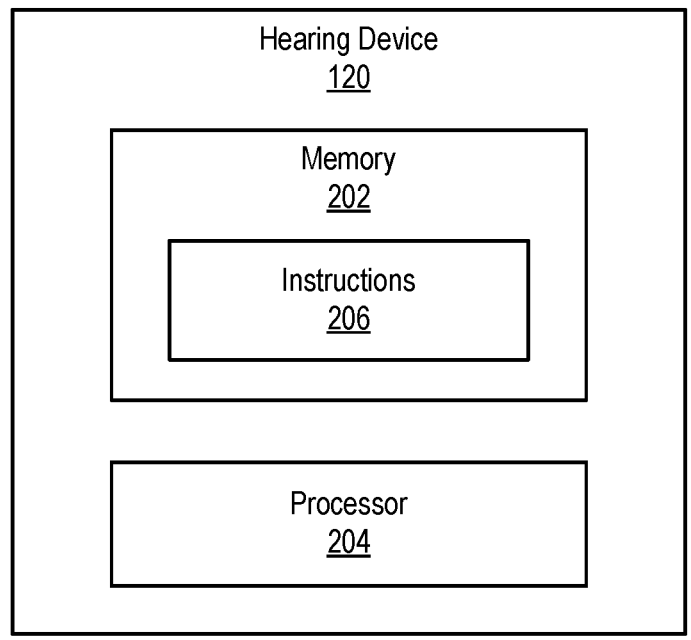
FIG. 2 illustrates an exemplary hearing device.

FIG. 2 illustrates an exemplary hearing device 120. As shown, hearing device 120 may include, without limitation, a memory 202 and a processor 204 selectively and communicatively coupled to one another. Memory 202 and processor 204 may each include or be implemented by hardware and/or software components (e.g., processors, memories, communication interfaces, instructions stored in memory for execution by the processors, etc.).

Memory 202 may maintain (e.g., store) executable data used by processor 204 to perform any of the operations described herein. For example, memory 202 may store instructions 206 that may be executed by processor 204 to perform any of the operations associated with hearing device 120 described herein. Instructions 206 may be implemented by any suitable application, software, code, and/or other executable data instance.

Memory 202 may also maintain any data received, generated, managed, used, and/or transmitted by processor 204. For example, memory 202 may maintain data representative of any information associated with a hearing loss profile of a user of hearing device 120, any of the thresholds described herein, and/or any other suitable information. In addition, memory 202 may maintain any data suitable to facilitate communications (e.g., wired and/or wireless communications) between hearing device 120 and other entities of system 100, such as user interface device 130 and computing device 140 described herein. Memory 202 may maintain additional or alternative data in other implementations.

Processor 204 may be configured to perform any suitable processing operation that may be associated with hearing device 120 such as by representing audio content to a user of hearing device 120. For example, when hearing device 120 corresponds to a hearing aid device, such processing operations may include monitoring ambient sound and/or representing sound to a user via a speaker. In examples where hearing device 120 is included as part of a cochlear implant system, such processing operations may include directing a cochlear implant to generate and apply electrical stimulation representative of one or more audio signals (e.g. one or more audio signals detected by a microphone, input by way of an auxiliary audio input port, etc.) to one or more stimulation sites associated with an auditory pathway (e.g., the auditory nerve) of a user.

Processor 204 may be further configured to perform (e.g., execute instructions 206 stored in memory 202 to perform) various processing operations associated with establishing pairing relationships between hearing device 120 and other devices. Such processing operations are described herein. References herein to operations performed by hearing device 120 may be understood to be performed by processor 204.

Figure 3:
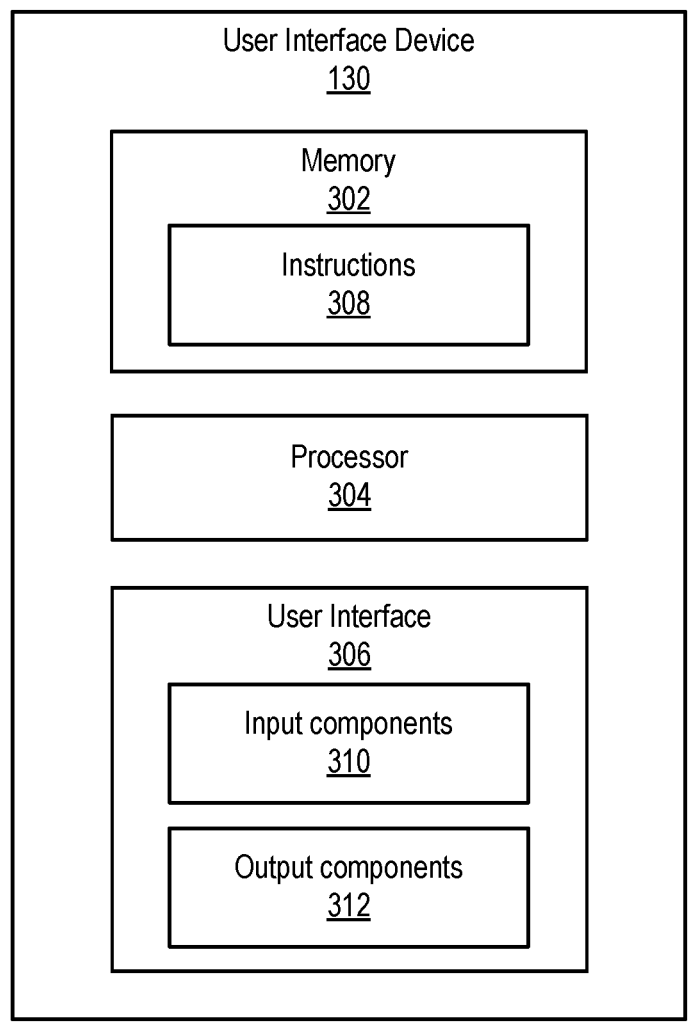
FIG. 3 illustrates an exemplary user interface device.

FIG. 3 illustrates an exemplary user interface device 130. As shown, user interface device 130 may include, without limitation, a memory 302, a processor 304, and a user interface 306 selectively and communicatively coupled to one another. Memory 302 and processor 304 may each include or be implemented by hardware and/or software components (e.g., processors, memories, communication interfaces, instructions stored in memory for execution by the processors, etc.).

Memory 302 may maintain (e.g., store) executable data (e.g. instructions 308) used by processor 304 to perform various operations described herein. Instructions 308 may be implemented by any suitable application, software, code, and/or other executable data instance. Memory 302 may also maintain any data received, generated, managed, used, and/or transmitted by processor 304. In addition, memory 302 may maintain any data suitable to facilitate communications (e.g., wired and/or wireless communications) between user interface device 130 and other components of system 100, such as hearing device 120 and computing device 140 described herein. Memory 302 may maintain additional or alternative data in other implementations.

Processor 304 may be configured to perform (e.g., execute instructions 308 stored in memory 302 to perform) various processing operations described herein. References herein to operations performed by user interface device 130 may be understood to be performed by processor 304.

User interface 306 may include input components 310 configured to receive user input from a user and output components 312 configured to provide output to the user. Input components 310 and output components 312 may include any hardware, firmware, software, or combination thereof that respectively support input and output capabilities. For example, input components 310 may include hardware and/or software for capturing various user inputs. Non-limiting examples of input components 310 include keyboards, keypads, input buttons, pointing components (e.g., a computer mouse), touchscreen components (e.g., a touchscreen display), audio components (e.g., a microphone), receiving components (e.g., a radio frequency (RF) or infrared receiver), motion sensors, fingerprint sensors, tap detection sensors, camera (e.g., for facial detection, iris scanning, etc.) and/or other types of input device. Output components 312 may include hardware and/or software for presenting various outputs to the user. Non-limiting examples of output components 312 include display components (e.g., a display screen for displaying characters, numbers, Quick Response (QR) code, etc.), audio components (e.g., an audio speaker), a graphics engine, output drivers (e.g., display drivers, audio drivers), and/or other types of output device.

Figure 4:
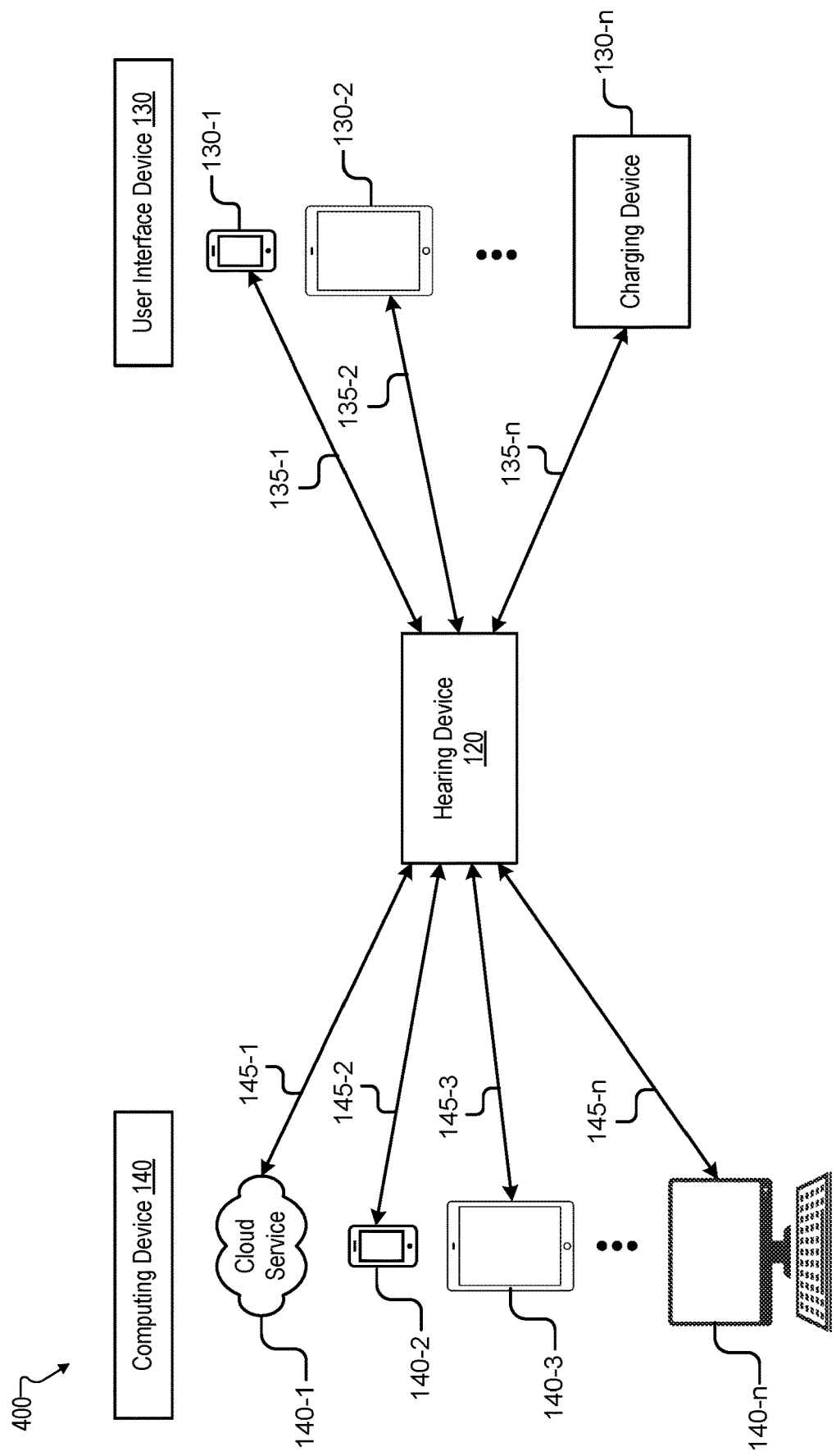
FIG. 4 illustrates an exemplary system.

FIG. 4 shows a diagram 400 illustrating an exemplary implementation of system 100. As depicted, system 100 may include hearing device 120, user interface device 130-1, 130-2, . . . 130-n (commonly referred to herein as user interface device 130), and computing device 140-1, 140-2, . . . 140-n (commonly referred to herein as computing device 140). Non-limiting examples of user interface device 130 include, but are not limited to, a mobile phone, a tablet, a wearable device (e.g., a smart watch), a charging device that includes input/output components (e.g., a display, a touchscreen) and that can be used to provide power to hearing device 120, etc. Non-limiting examples of computing device 140 include, but are not limited to, a mobile phone, a tablet, a laptop, a personal computer, a cloud computing system, etc. Other types of user interface device 130 and computing device 140 are also possible and contemplated.

As depicted in FIG. 4, hearing device 120 and each user interface device 130 may establish a first pairing relationship 135 (e.g., first pairing relationship 135-1 through 135-n) therebetween. As described herein, hearing device 120 and each user interface device 130 may establish a communication channel therebetween based on the corresponding first pairing relationship 135 and may communicate data with one another via the communication channel. The data communicated between hearing device 120 and a particular user interface device 130 via the communication channel established between them may be used to perform various operations between hearing device 120 and one or more of computing devices 140. For example, a user may provide user input via any one of user interface devices 130 (e.g., user interface device 130-1). The user input may be transmitted to hearing device 120 via the communication channel between hearing device 120 and such user interface device 130 among multiple communication channels and may be used in establishing one or more second pairing relationships 145 (e.g., second pairing relationships 145-1 through 145-n) between hearing device 120 and one or more of computing devices 140.

In some alternative embodiments, hearing device 120 may be paired with only one user interface device 130. In this case, the only communication channel established based on first pairing relationship 135 between hearing device 120 and the only user interface device 130 may be used to exchange data for operations performed between hearing device 120 and one or more of computing devices 140.

Figure 5:
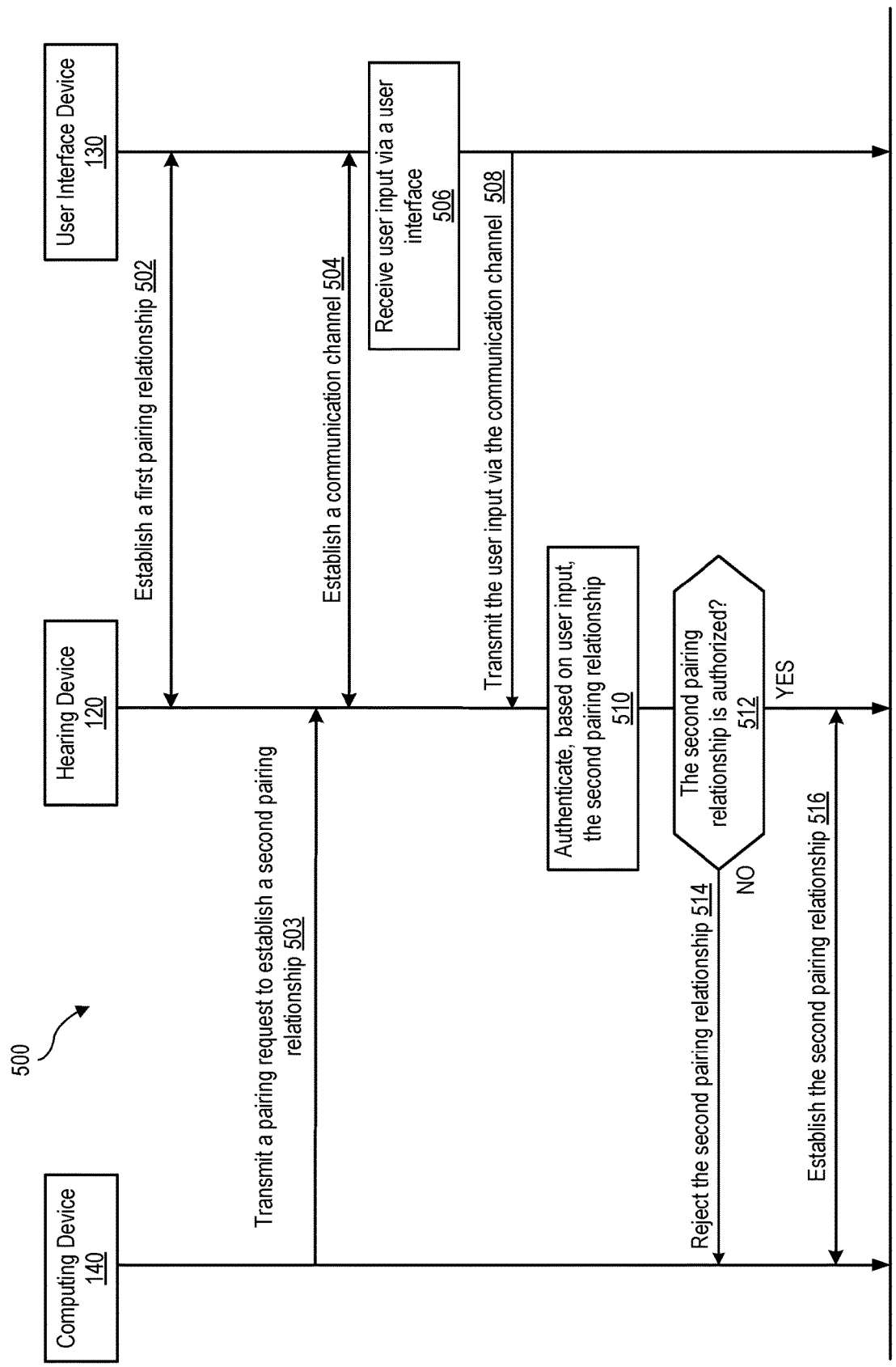
FIG. 5 illustrates an exemplary flowchart showing operations that may be performed by devices in the system of FIG. 1.

FIG. 5 illustrates an exemplary flowchart 500 depicting operations that may be performed by the devices (e.g., hearing device 120, user interface device 130, and computing device 140) in system 100. In some embodiments, flowchart 500 may be initiated in response to a user request provided by a user to pair hearing device 120 with user interface device 130. Alternatively, flowchart 500 may be initiated in response to a user request provided by the user to pair hearing device 120 with computing device 140. In some embodiments, the user may provide the user request to hearing device 120 or user interface device 130 using a voice command or using an input component (e.g., a button) of hearing device 120 or user interface device 130.

At operation 502, hearing device 120 and user interface device 130 may establish a first pairing relationship therebetween. As described in detail herein, to establish the first pairing relationship, one or both of hearing device 120 and user interface device 130 may authorize the first pairing relationship via data authentication that is based on data exchanged through a temporary and short-range authentication channel between hearing device 120 and user interface device 130. This is described in more detail herein.

In some embodiments, hearing device 120 and user interface device 130 may be paired with one another within a secure environment (e.g., a manufacturing facility) at a production time. This is described in more detail herein.

In some embodiments, hearing device 120 and user interface device 130 may establish the first pairing relationship without any requirement regarding authentication and/or secure environment. However, in this case, to establish a second pairing relationship using data exchanged through a communication channel between hearing device 120 and user interface device 130 that is based on the first pairing relationship, the first pairing relationship and the second pairing relationship may need to be significantly separate from one another in terms of their timestamps and/or locations as described herein.

At operation 503, computing device 140, which is distinct from user interface device 130, may transmit to hearing device 120 a pairing request to establish a second pairing relationship between computing device 140 and hearing device 120. Alternatively, hearing device 120 may transmit to computing device 140 the pairing request to establish the second pairing relationship. It should be understood that the pairing request to establish the second pairing relationship between computing device 140 and hearing device 120 may be initiated by computing device 140 or by hearing device 120 at any time after the first pairing relationship between hearing device 120 and user interface device 130 is established.

At operation 504, in response to this pairing request, hearing device 120 and user interface device 130 may establish a communication channel between hearing device 120 and user interface device 130 based on the first pairing relationship. In some embodiments, hearing device 120 and user interface device 130 may automatically establish this communication channel without any user action and/or authentication due to the first pairing relationship previously established between hearing device 120 and user interface device 130. In some embodiments, the establishment of the communication channel between hearing device 120 and user interface device 130 based on the first pairing relationship may be initiated by hearing device 120, user interface device 130, and/or may require collaboration between hearing device 120 and user interface device 130.

In some embodiments, once the communication channel between hearing device 120 and user interface device 130 is established based on the first pairing relationship, the user may interact with hearing device 120 via user interface device 130. For example, the user may provide user input via input components 310 (e.g., keypad, touchscreen, etc.) of user interface device 130 and user interface device 130 may transmit the user input to hearing device 120 via the communication channel. Additionally or alternatively, user interface device 130 may receive output from hearing device 120 via the communication channel and provide the output to the user via output components 312 (e.g., display screen, audio speaker, etc.) of user interface device 130. At operation 506, user interface device 130 may receive user input via a user interface of user interface device 130. As an example, for the pairing request to establish the second pairing relationship between hearing device 120 and computing device 140, user interface device 130 may receive (e.g., via input components 310) user input provided by the user for this pairing request. The user input may include authentication data related to the second pairing relationship. For example, the user input may include authentication data (e.g., passcode, passkey, PIN, etc.) of computing device 140 obtained by the user.

At operation 508, user interface device 130 may transmit the user input to hearing device 120 based on the first pairing relationship. For example, user interface device 130 may transmit the user input to hearing device 120 via the communication channel between hearing device 120 and user interface device 130 that is established based on the first pairing relationship. In some embodiments, hearing device 120 may also transmit authentication data (e.g., a passcode, a passkey, a PIN, etc.) of hearing device 120 to user interface device 130 via the communication channel between hearing device 120 and user interface device 130. User interface device 130 may then display the authentication data of hearing device 120 via its user interface for the user to obtain and provide to computing device 140.

At operation 510, hearing device 120 may authenticate the second pairing relationship between hearing device 120 and computing device 140 based on the user input. For example, hearing device 120 may compare the user input that is received from user interface device 130 with authentication data that is received from computing device 140. If the user input received from user interface device 130 matches the authentication data received from computing device 140, hearing device 120 may determine that the second pairing relationship between hearing device 120 and computing device 140 is legitimate, and therefore authorize the second pairing relationship between hearing device 120 and computing device 140. Otherwise, hearing device 120 may not authorize the second pairing relationship between hearing device 120 and computing device 140.

Similarly, computing device 140 may compare user input indicating the authentication data of hearing device 120 obtained and provided by the user with authentication data received from hearing device 120. If the user input provided by the user matches the authentication data received from hearing device 120, computing device 140 may determine that the second pairing relationship between hearing device 120 and computing device 140 is legitimate, and therefore authorize the second pairing relationship between hearing device 120 and computing device 140. Otherwise, computing device 140 may not authorize the second pairing relationship between hearing device 120 and computing device 140.

At operation 512, if the second pairing relationship between hearing device 120 and computing device 140 is not authorized by one or both of hearing device 120 and computing device 140, flowchart 500 may proceed to operation 514. At operation 514, hearing device 120 may reject the second pairing relationship between hearing device 120 and computing device 140, and therefore the second pairing relationship between hearing device 120 and computing device 140 may not be established.

On the other hand, at operation 512, if the second pairing relationship between hearing device 120 and computing device 140 is authorized by one or both of hearing device 120 and computing device 140, flowchart 500 may proceed to operation 516.

At operation 516, hearing device 120 and computing device 140 may establish the second pairing relationship between hearing device 120 and computing device 140. For example, hearing device 120 may maintain a paired device list specifying one or more devices that are authorized to connect with hearing device 120. Accordingly, hearing device 120 may update its paired device list to include computing device 140 in the paired device list. Similarly, computing device 140 may also maintain a paired device list specifying one or more devices that are authorized to connect with computing device 140. Accordingly, computing device 140 may update its paired device list to include hearing device 120 in the paired device list. Once the second pairing relationship between hearing device 120 and computing device 140 is formed, hearing device 120 and computing device 140 may automatically establish a communication channel therebetween based on the second pairing relationship.

For example, hearing device 120 may determine that computing device 140 is included in its paired device list. Computing device 140 may determine that hearing device 120 is included in its paired device list. Accordingly, hearing device 120 and computing device 140 may determine that they are previously paired with one another. Therefore, hearing device 120 and computing device 140 may automatically establish a communication channel therebetween without requiring any user action and/or authentication due to the second pairing relationship between them. In some embodiments, the establishment of the communication channel between hearing device 120 and computing device 140 based on the second pairing relationship may be initiated by hearing device 120, computing device 140, and/or may require collaboration between hearing device 120 and computing device 140. Once the communication channel between hearing device 120 and computing device 140 is established, hearing device 120 and computing device 140 may communicate with one another via this communication channel.

In some alternative embodiments, to authenticate the second pairing relationship, hearing device 120 may transmit authentication data (e.g., a passcode, a passkey, a PIN, etc.) to user interface device 130 via the communication channel between hearing device 120 and user interface device 130 that is established based on the first pairing relationship. The authentication data may be usable to authenticate the second pairing relationship between hearing device 120 and computing device 140.

To illustrate, user interface device 130 may receive the authentication data from hearing device 120 via the communication channel and present the authentication data to the user (e.g., visually and/or audibly). The user may compare the authentication data with authentication data being presented by computing device 140. If the authentication data presented by computing device 140 matches the authentication data presented by user interface device 130, the user may determine that the second pairing relationship between hearing device 120 and computing device 140 is legitimate, and therefore authorize the second pairing relationship between hearing device 120 and computing device 140 (e.g., by selecting an authorization option presented by user interface device 130 and/or computing device 140).

Additionally or alternatively, the user may obtain the authentication data presented on user interface device 130, and provide a user input indicating such authentication data to computing device 140. Computing device 140 may then authenticate the second pairing relationship between hearing device 120 and computing device 140 based on the user input indicating the authentication data. This may be performed in any suitable manner.

Figure 6:
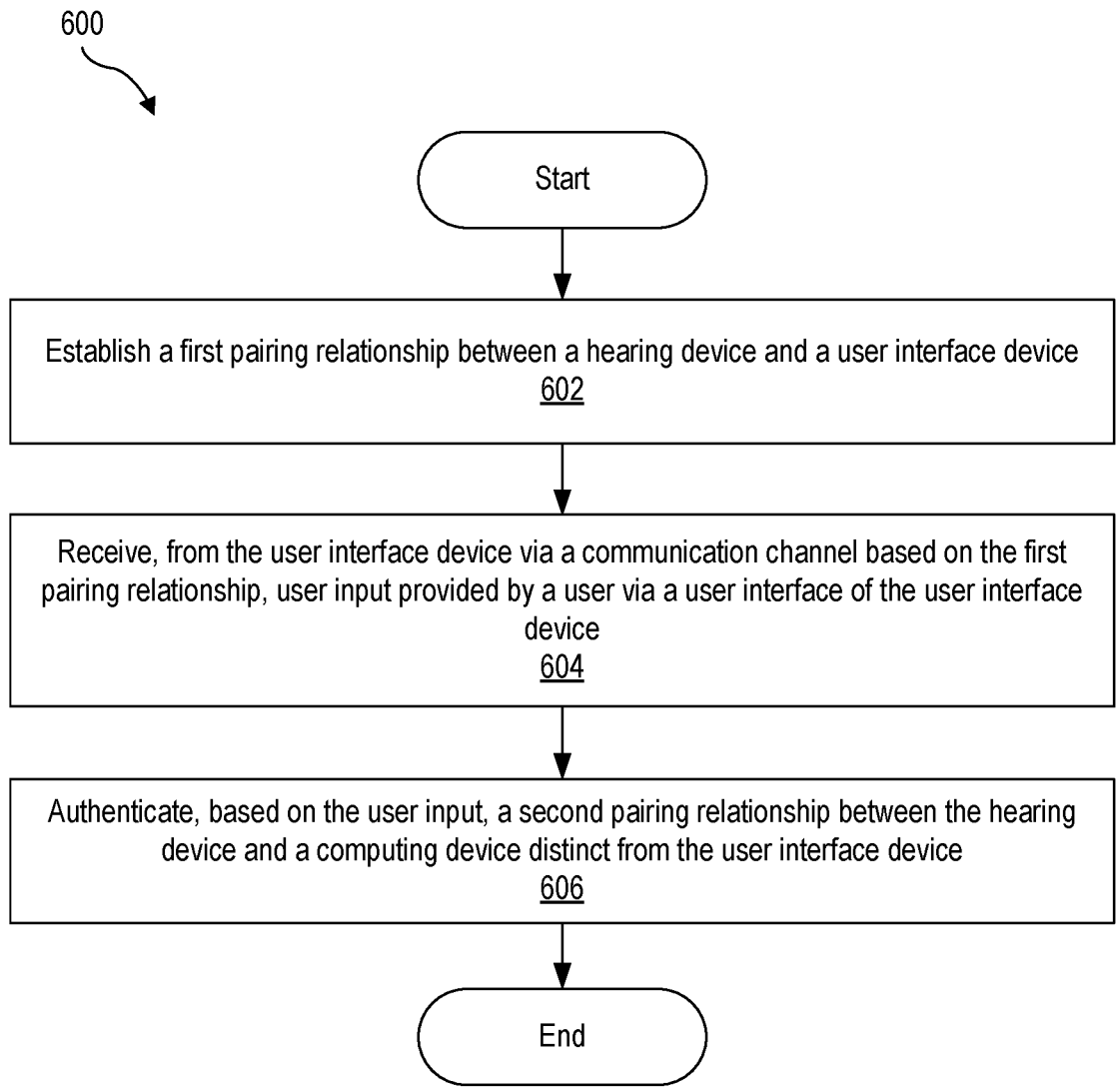
FIG. 6 illustrates an exemplary flowchart showing operations that may be performed by the hearing device of FIG. 2.

In some embodiments, the operations to establish the first pairing relationship between hearing device 120 and user interface device 130 and/or the second pairing relationship between hearing device 120 and computing device 140 may be performed in full or in part by hearing device 120. FIG. 6 illustrates an exemplary flowchart 600 depicting operations that may be performed by hearing device 120 (e.g., processor 204).

At operation 602, hearing device 120 may establish a first pairing relationship between hearing device 120 and user interface device 130. Once the first pairing relationship between hearing device 120 and user interface device 130 is formed, when hearing device 120 and user interface device 130 are located within a communication range from one another that allows them to communicate, hearing device 120 and user interface device 130 may automatically establish a communication channel between hearing device 120 and user interface device 130 based on the first pairing relationship as described herein.

At operation 604, hearing device 120 may receive user input from user interface device 130 via the communication channel between hearing device 120 and user interface device 130. The user input may be provided by the user via the user interface (e.g., user interface 306) of user interface device 130. For example, hearing device 120 may receive, from user interface device 130 via the communication channel, user input including authentication data (e.g., passcode, passkey, PIN, etc.) of computing device 140 that the user obtained to establish a second pairing relationship between hearing device 120 and computing device 140. As described herein, computing device 140 may be distinct from user interface device 130. In some embodiments, hearing device 120 may also transmit authentication data (e.g., passcode, passkey, PIN, etc.) of hearing device 120 to user interface device 130 via the communication channel between hearing device 120 and user interface device 130. User interface device 130 may then display the authentication data of hearing device 120 via its user interface for the user to obtain and provide to computing device 140 as described herein.

At operation 606, hearing device 120 may authenticate the second pairing relationship between hearing device 120 and computing device 140 based on the user input. For example, hearing device 120 may evaluate the second pairing relationship between hearing device 120 and computing device 140 based on the user input to authorize or reject the second pairing relationship as described herein. In some embodiments, if the second pairing relationship between hearing device 120 and computing device 140 is authorized by one or both of hearing device 120 and computing device 140, hearing device 120 and computing device 140 may establish the second pairing relationship therebetween. Once the second pairing relationship between hearing device 120 and computing device 140 is formed, when hearing device 120 and computing device 140 are located within a communication range from one another that allows them to communicate, hearing device 120 and computing device 140 may automatically establish a communication channel between hearing device 120 and computing device 140 without any user action and/or authentication due to the second pairing relationship that was previously established between hearing device 120 and computing device 140. As described herein, hearing device 120 and computing device 140 may then communicate with one another via this communication channel.

In some embodiments, to prevent attackers from interfering with the second pairing relationship to connect a malicious computing device with hearing device 120, the communication channel between hearing device 120 and user interface device 130 through which data being used to establish the second pairing relationship is communicated may need to be secure. Therefore, the first pairing relationship based on which the communication channel between hearing device 120 and user interface device 130 is established may need to be formed in a secure manner.

In some embodiments, hearing device 120 may securely establish the first pairing relationship between hearing device 120 and user interface device 130 based on data authentication. In some embodiments, hearing device 120 and user interface device 130 may temporarily establish an authentication channel between hearing device 120 and user interface device 130. The authentication channel may be a secured channel that cannot be interfered by an attacker and may be referred to herein as an out-of-band channel. For example, the authentication channel may be a short-range communication channel configured to transmit or receive data over a relatively short distance (e.g., a few centimeters or a few inches). Due to the short range of the authentication channel between hearing device 120 and user interface device 130, an attacker (e.g., a man-in-the-middle, a machine-in-the-middle, etc.) may need to be present proximate to hearing device 120 and user interface device 130 in order to interfere with the first pairing relationship between them, and therefore the attacker can be easily detected by the user. In some embodiments, hearing device 120 and user interface device 130 may exchange authentication data via the authentication channel. For example, hearing device 120 and user interface device 130 may exchange their passkey, passcode, PIN, and/or other type of authentication data with one another via the authentication channel.

As an example of the authentication channel, user interface device 130 may be implemented by a charging device of hearing device 120. The charging device of hearing device 120 may be configured to provide power to hearing device 120 and may also include one or more input/output components (e.g., keypad, touchscreen, etc.) which the user may use to interact with hearing device 120 as described herein. In some embodiments, hearing device 120 may determine that hearing device 120 is coupled with the charging device via one or more wired charging contacts. For example, hearing device 120 may determine that hearing device 120 is inserted into a receiving portion of the charging device to receive power from the charging device. Alternatively, hearing device 120 may determine that hearing device 120 is coupled to the charging device via a short-range wireless connection of a wireless charging loop to receive power from the charging device. Accordingly, hearing device 120 and the charging device may couple to one another via a power charging channel through which the charging device may provide power for hearing device 120. The power charging channel may be established and maintained between hearing device 120 and the charging device when hearing device 120 and the charging device are connected to one another via the wired charging contacts or the wireless charging loop.

In some embodiments, because the power charging channel between hearing device 120 and the charging device cannot be interfered by an attacker due to its short range, the power charging channel may be used as the authentication channel (e.g., out-of-band channel) to exchange the authentication data between hearing device 120 and user interface device 130. For example, the authentication data may be modulated onto signals being transmitted via the power charging channel, and thus the authentication data may be securely exchanged between hearing device 120 and user interface device 130.

As another example of the authentication channel, hearing device 120 and user interface device 130 may establish a temporary communication channel. The temporary communication channel may be secured in any suitable manner such that the temporary communication channel may be used to securely transmit authentication data between hearing device 120 and user interface device. Other types of authentication channel are also possible and contemplated.

In some embodiments, the authentication channel between hearing device 120 and user interface device 130 may be established and/or configured based on a distance between hearing device 120 and user interface device 130. The distance may be determined by hearing device 120 and/or user interface device 130 in any suitable manner (e.g., by determining physical locations of hearing device 120 and user interface device 130 using position sensors such as global positioning system (GPS) sensors and computing the distance between these physical locations).

To illustrate, hearing device 120 may determine a communication protocol for the authentication channel based on the distance. As an example, hearing device 120 may determine that the distance between hearing device 120 and user interface device 130 is less than a threshold distance (e.g., a predefined number of centimeters), and therefore determine that the authentication channel may be established using a particular communication protocol (e.g., a Near Field Communication (NFC) protocol).

Additionally or alternatively, hearing device 120 may configure one or more parameters of the authentication channel between hearing device 120 and user interface device 130 based on the distance. For example, hearing device 120 may set the transmission power for the authentication channel to be based on (e.g., proportional to) the distance between hearing device 120 and user interface device 130.

In some embodiments, hearing device 120 and user interface device 130 may authenticate the first pairing relationship between hearing device 120 and user interface device 130 based on the authentication data. For example, hearing device 120 may compare the authentication data received from user interface device 130 via the authentication channel with the authentication data maintained at hearing device 120. The authentication data maintained at hearing device 120 may be authentication data (e.g., passkey, passcode, PIN, etc.) associated with user interface device 130 that is provided to hearing device 120 when hearing device 120 is manufactured and/or configured. If the authentication data received from user interface device 130 matches the authentication data maintained at hearing device 120, hearing device 120 may determine that the first pairing relationship between hearing device 120 and user interface device 130 is legitimate, and therefore authorize the first pairing relationship between hearing device 120 and user interface device 130.

Similarly, user interface device 130 may compare the authentication data received from hearing device 120 via the authentication channel with the authentication data maintained at user interface device 130. The authentication data maintained at user interface device 130 may be authentication data (e.g., passkey, passcode, PIN, etc.) associated with hearing device 120 that is provided to user interface device 130 when user interface device 130 is manufactured and/or configured. If the authentication data received from hearing device 120 matches the authentication data maintained at user interface device 130, user interface device 130 may determine that the first pairing relationship between hearing device 120 and user interface device 130 is legitimate, and therefore authorize the first pairing relationship between hearing device 120 and user interface device 130.

In some embodiments, in response to the first pairing relationship between hearing device 120 and user interface device 130 being authorized by one or both of hearing device 120 and user interface device 130, hearing device 120 and user interface device 130 may establish the first pairing relationship therebetween. For example, similar to establishing the second pairing relationship between hearing device 120 and computing device 140 described herein, hearing device 120 may update its paired device list to include user interface device 130 in its paired device list. Similar to the paired device list of hearing device 120, user interface device 130 may maintain a paired device list specifying one or more devices that are authorized to connect with user interface device 130. Accordingly, user interface device 130 may update its paired device list to include hearing device 120 in its paired device list.

In some embodiments, instead of relying on data authentication between hearing device 120 and user interface device 130 to establish the first pairing relationship, the first pairing relationship between hearing device 120 and user interface device 130 may be established in a secure environment. For example, the first pairing relationship between hearing device 120 and user interface device 130 may be established at a production time and within a manufacturing facility in which hearing device 120 and user interface device 130 may be subjected to various types of protection against security attacks.

In some embodiments, the first pairing relationship between hearing device 120 and user interface device 130 may be established without data authentication and/or secure environment as described above. In this case, as the data transmitted via the communication channel based on the first pairing relationship is used to establish the second pairing relationship, the second pairing relationship between hearing device 120 and computing device 140 may need to be sufficiently separated from the first pairing relationship between hearing device 120 and user interface device 130 in terms of time (e.g., timestamp) and/or location (e.g., geographical location determined by a GPS device or service and/or by other similar location devices or services).

In some embodiments, hearing device 120 may determine a first timestamp associated with the first pairing relationship between hearing device 120 and user interface device 130. For example, hearing device 120 may determine the first timestamp to be a time at which the first pairing relationship between hearing device 120 and user interface device 130 is requested or established. In some embodiments, hearing device 120 may determine a second timestamp associated with the second pairing relationship between hearing device 120 and computing device 140. For example, hearing device 120 may determine the second timestamp to be a time at which the second pairing relationship between hearing device 120 and computing device 140 is requested.

In some embodiments, hearing device 120 may compute a time difference between the first timestamp associated with the first pairing relationship and the second timestamp associated with the second pairing relationship, and determine whether such time difference satisfies a time difference threshold. For example, hearing device 120 may determine whether the time difference between the first timestamp associated with the first pairing relationship and the second timestamp associated with the second pairing relationship is equal to or greater than a predefined time period (e.g., a predefined number of hours).

In some embodiments, hearing device 120 may determine that the time difference between the first timestamp associated with the first pairing relationship and the second timestamp associated with the second pairing relationship satisfies the time difference threshold. For example, hearing device 120 may determine that the time difference between the first timestamp and the second timestamp is equal to or higher than the predefined time period. Accordingly, hearing device 120 may determine that the first pairing relationship between hearing device 120 and user interface device 130 and the second pairing relationship between hearing device 120 and computing device 140 are significantly separate from one another in terms of timestamp. As a result, a risk of an attacker being present at the first timestamp and also at the second timestamp to interfere with both the first pairing relationship and the second pairing relationship may be minimal.

In some embodiments, in response to the determining that the time difference between the first timestamp associated with the first pairing relationship and the second timestamp associated with the second pairing relationship satisfies the time difference threshold, hearing device 120 may authorize the second pairing relationship between hearing device 120 and computing device 140. In some embodiments, if the second pairing relationship is authorized by one or both of hearing device 120 and computing device 140, hearing device 120 and computing device 140 may establish the second pairing relationship between hearing device 120 and computing device 140.

In some embodiments, hearing device 120 may determine that the time difference between the first timestamp associated with the first pairing relationship and the second timestamp associated with the second pairing relationship does not satisfy the time difference threshold. For example, hearing device 120 may determine that the time difference between the first timestamp and the second timestamp is not equal to or higher than the predefined time period. Accordingly, hearing device 120 may determine that the first pairing relationship between hearing device 120 and user interface device 130 and the second pairing relationship between hearing device 120 and computing device 140 are not significantly separate from one another in terms of time. As a result, the risk of an attacker being present at the first timestamp and also at the second timestamp to interfere with both the first pairing relationship and the second pairing relationship may be relatively high.

In some embodiments, in response to the determining that the time difference between the first timestamp associated with the first pairing relationship and the second timestamp associated with the second pairing relationship does not satisfy the time difference threshold, hearing device 120 may reject the second pairing relationship between hearing device 120 and computing device 140. As a result, the second pairing relationship between hearing device 120 and computing device 140 may not be established.

Accordingly, the second pairing relationship may be authorized only if the time difference between the first timestamp associated with the first pairing relationship and the second timestamp associated with the second pairing relationship satisfies the time difference threshold. In some embodiments, the time difference threshold may be defined in a default configuration of hearing device 120.

Additionally or alternatively, the time difference threshold may be configured by the user of hearing device 120. For example, the user of hearing device 120 may selectively set up the time difference threshold based on a security level of a context in which hearing device 120 is usually used by the user.

Additionally or alternatively, the time difference threshold may be configured based on an attribute of a pairing operation to establish the first pairing relationship between hearing device 120 and user interface device 130. For example, if the first pairing relationship is automatically established between hearing device 120 and user interface device 130 as a generic power-on operation without any user action and/or authentication, hearing device 120 may configure the time difference threshold to be a first time period. On the other hand, if the establishment of the first pairing relationship between hearing device 120 and user interface device 130 requires a user action and/or authentication, hearing device 120 may configure the time difference threshold to be a second time period that is shorter than the first time period.

In some embodiments, instead of or in addition to evaluating the separation between the first pairing relationship and the second pairing relationship in terms of their timestamps, hearing device 120 may evaluate the separation between the first pairing relationship and the second pairing relationship in terms of their locations (e.g., geographical locations as determined by a GPS service or by other similar location service).

In some embodiments, hearing device 120 may determine a first location associated with the first pairing relationship between hearing device 120 and user interface device 130. For example, hearing device 120 may determine the first location to be a location at which the first pairing relationship between hearing device 120 and user interface device 130 is requested or established. In some embodiments, hearing device 120 may determine a second location associated with the second pairing relationship between hearing device 120 and computing device 140. For example, hearing device 120 may determine the second location to be a location at which the second pairing relationship between hearing device 120 and computing device 140 is requested.

In some embodiments, hearing device 120 may compute a location difference between the first location associated with the first pairing relationship and the second location associated with the second pairing relationship, and determine whether such location difference satisfies a location difference threshold. For example, hearing device 120 may determine whether the location difference between the first location associated with the first pairing relationship and the second location associated with the second pairing relationship is equal to or higher than a predefined distance (e.g., a predefined number of meters).

In some embodiments, hearing device 120 may determine that the location difference between the first location associated with the first pairing relationship and the second location associated with the second pairing relationship satisfies the location difference threshold. For example, hearing device 120 may determine that the location difference between the first location and the second location is equal to or higher than the predefined distance. Accordingly, hearing device 120 may determine that the first pairing relationship between hearing device 120 and user interface device 130 and the second pairing relationship between hearing device 120 and computing device 140 are significantly separate from one another in terms of location. As a result, a risk of an attacker being present at the first location and also at the second location to interfere with both the first pairing relationship and the second pairing relationship may be minimal.

In some embodiments, in response to the determining that the location difference between the first location associated with the first pairing relationship and the second location associated with the second pairing relationship satisfies the location difference threshold, hearing device 120 may authorize the second pairing relationship between hearing device 120 and computing device 140. In some embodiments, if the second pairing relationship is authorized by one or both of hearing device 120 and computing device 140, hearing device 120 and computing device 140 may establish the second pairing relationship between hearing device 120 and computing device 140.

In some embodiments, hearing device 120 may determine that the location difference between the first location associated with the first pairing relationship and the second location associated with the second pairing relationship does not satisfy the location difference threshold. For example, hearing device 120 may determine that the location difference between the first location and the second location is not equal to or higher than the predefined distance. Accordingly, hearing device 120 may determine that the first pairing relationship between hearing device 120 and user interface device 130 and the second pairing relationship between hearing device 120 and computing device 140 are not significantly separate from one another in terms of location. As a result, the risk of an attacker being present at the first location and also at the second location to interfere with both the first pairing relationship and the second pairing relationship may be relatively high.

In some embodiments, in response to the determining that the location difference between the first location associated with the first pairing relationship and the second location associated with the second pairing relationship does not satisfy the location difference threshold, hearing device 120 may reject the second pairing relationship between hearing device 120 and computing device 140. As a result, the second pairing relationship between hearing device 120 and computing device 140 may not be established.

Accordingly, the second pairing relationship may be authorized only if the location difference between the first location associated with the first pairing relationship and the second location associated with the second pairing relationship satisfies the location difference threshold. In some embodiments, the location difference threshold may be defined in a default configuration of hearing device 120.

Additionally or alternatively, the location difference threshold may be configured by the user of hearing device 120. For example, the user of hearing device 120 may selectively set up the location difference threshold based on a security level of a context in which hearing device 120 is usually used by the user.

Additionally or alternatively, the location difference threshold may be configured based on an attribute of the pairing operation to establish the first pairing relationship between hearing device 120 and user interface device 130. For example, if the first pairing relationship is automatically established between hearing device 120 and user interface device 130 as a generic power-on operation without any user action and/or authentication, hearing device 120 may configure the location difference threshold to be a first distance. On the other hand, if the establishment of the first pairing relationship between hearing device 120 and user interface device 130 requires a user action and/or authentication, hearing device 120 may configure the location difference threshold to be a second distance that is shorter than the first distance.

In some embodiments, hearing device 120 may evaluate the separation between the first pairing relationship and the second pairing relationship both in terms of their time (e.g., timestamps) and in terms of their locations (e.g., geographical locations as determined by a GPS service or by other similar location service).

For example, hearing device 120 may determine that the time difference between the first timestamp associated with the first pairing relationship and the second timestamp associated with the second pairing relationship satisfies the time difference threshold. Hearing device 120 may also determine that the location difference between the first location associated with the first pairing relationship and the second location associated with the second pairing relationship satisfies the location difference threshold. Accordingly, hearing device 120 may determine that the first pairing relationship between hearing device 120 and user interface device 130 and the second pairing relationship between hearing device 120 and computing device 140 are significantly separate from one another both in terms of time and in terms of location. As a result, a risk of an attacker being present at the first timestamp at the first location and also present at the second timestamp at the second location to interfere with both the first pairing relationship and the second pairing relationship may be minimal. Accordingly, hearing device 120 may authorize the second pairing relationship between hearing device 120 and computing device 140. In some embodiments, if the second pairing relationship is authorized by one or both of hearing device 120 and computing device 140, hearing device 120 and computing device 140 may establish the second pairing relationship between hearing device 120 and computing device 140 as described herein.

In some embodiments, the first pairing relationship between hearing device 120 and user interface device 130 may be established based on a first communication protocol. Non-limiting examples of the first communication protocol include a Bluetooth Basic Rate/Enhanced Data Rate (BR/EDR) protocol, a Bluetooth Low Energy (LE) protocol, a specialized protocol associated with hearing device 120 and user interface device 130, etc. In some embodiments, the specialized protocol implemented between hearing device 120 and user interface device 130 may be specifically defined and internally used within an organization. Other types of the first communication protocol are also possible and contemplated.

In some embodiments, the second pairing relationship between hearing device 120 and computing device 140 may be established based on a second communication protocol. Non-limiting examples of the second communication protocol include the Bluetooth BR/EDR protocol, the Bluetooth LE protocol, a specialized protocol associated with hearing device 120 and computing device 140, etc. In some embodiments, the specialized protocol implemented between hearing device 120 and computing device 140 may be specifically defined and internally used within an organization. Other types of the second communication protocol are also possible and contemplated.

In some embodiments, the first communication protocol implemented between hearing device 120 and user interface device 130 may be the same as the second communication protocol implemented between hearing device 120 and computing device 140. Alternatively, the first communication protocol implemented between hearing device 120 and user interface device 130 may be distinct from the second communication protocol implemented between hearing device 120 and computing device 140. In this case, data being used to establish the second pairing relationship between hearing device 120 and computing device 140 may be transmitted via the communication channel between hearing device 120 and user interface device 130 that is based on a different communication protocol than the second pairing relationship.

As described herein, the communication channel between hearing device 120 and user interface device 130 may be used not only to transmit data for establishing the second pairing relationship between hearing device 120 and computing device 140 but also to transmit data related to other operations of hearing device 120. Because the data can be exchanged between hearing device 120 and user interface device 130 via the communication channel established therebetween, the user may conveniently interact with hearing device 120 using the user interface of user interface device 130 to perform various operations.

For example, the user may interact with hearing device 120 using one or more input components 310 and/or one or more output components 312 of user interface device 130 to adjust operation parameters of hearing device 120. The user may provide one or more user inputs associated with the user interaction of the user with hearing device 120 via input components 310 of user interface device 130. User interface device 130 may then transmit the one or more user inputs of the user to hearing device 120 via the communication channel between hearing device 120 and user interface device 130. In this example, hearing device 120 may receive the one or more user inputs associated with the user interaction from user interface device 130, and adjust the operation parameters of hearing device 120 based on the user inputs to perform the requested user interaction. Hearing device 120 may then transmit one or more outputs associated with the user interaction to user interface device 130 via the communication channel between hearing device 120 and user interface device 130. User interface device 130 may then display the one or more outputs associated with the user interaction to the user via output components 312 of user interface device 130.

In some embodiments, hearing device 120 may be paired with multiple user interface devices 130. For example, hearing device 120 may establish a third pairing relationship between hearing device 120 and an additional user interface device 130 that is distinct from user interface device 130. The third pairing relationship between hearing device 120 and additional user interface device 130 may be established in a manner similar to the first pairing relationship between hearing device 120 and user interface device 130 described herein. In some embodiments, once the third pairing relationship between hearing device 120 and additional user interface device 130 is formed, when hearing device 120 and additional user interface device 130 are located within a predefined range from one another, hearing device 120 and additional user interface device 130 may automatically establish a communication channel between hearing device 120 and additional user interface device 130 based on the third pairing relationship. Hearing device 120 and additional user interface device 130 may then communicate with one another via this communication channel.

For example, hearing device 120 may receive an additional user input from additional user interface device 130 via the communication channel between hearing device 120 and additional user interface device 130 that is based on the third pairing relationship. The additional user input may be provided by the user via a user interface (e.g., user interface 306) of additional user interface device 130. Hearing device 120 may then perform an operation on hearing device 120 based on the additional user input. Thus, hearing device 120 may quickly establish not only a communication channel with user interface device 130 but also a communication channel with additional user interface device 130 due to the first pairing relationship and the third pairing relationship. Accordingly, the user may conveniently interact with hearing device 120 not only via user interface device 130 but also via additional user interface device 130, depending on which user interface device 130 is located within a predefined range from hearing device 120 at a given timestamp so that a communication channel can be automatically established between such user interface device 130 and hearing device 120 at the given timestamp based on the corresponding pairing relationship.

In some embodiments, hearing device 120 can only be paired with one user interface device 130 at a given point in time so that the user can only use one user interface device 130 to interact with hearing device 120. In this case, when the third pairing relationship is established between hearing device 120 and additional user interface device 130, hearing device 120 may automatically terminate the first pairing relationship between hearing device 120 and user interface device 130. For example, hearing device 120 may automatically update its paired device list to include additional user interface device 130 in the paired device list and remove user interface device 130 from the paired device list.

Figure 7:
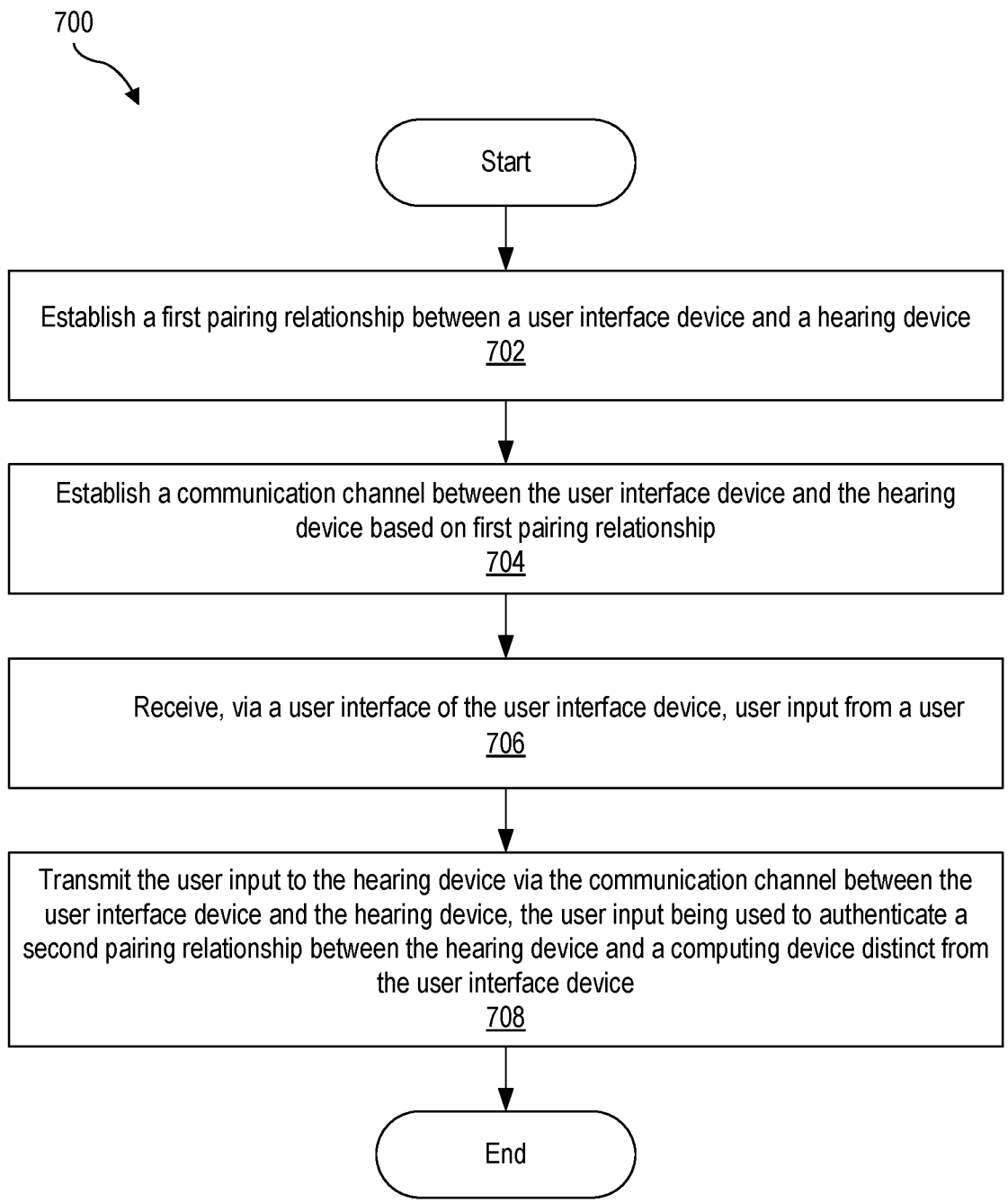
FIG. 7 illustrates an exemplary flowchart showing operations that may be performed by the user interface device of FIG. 3.

In some embodiments, the operations to establish the first pairing relationship between hearing device 120 and user interface device 130 and/or the second pairing relationship between hearing device 120 and computing device 140 may not be performed by hearing device 120 but may be performed in full or in part by user interface device 130. FIG. 7 illustrates an exemplary flowchart 700 depicting operations that may be performed by user interface device 130 (e.g., processor 304).

At operation 702, user interface device 130 may establish a first pairing relationship between user interface device 130 and hearing device 120. At operation 704, user interface device 130 may establish a communication channel between user interface device 130 and hearing device 120 based on the first pairing relationship. For example, at any time subsequent to the first pairing relationship being established between user interface device 130 and hearing device 120, when user interface device 130 and hearing device 120 are located within a communication range from one another, user interface device 130 may automatically establish a communication channel between user interface device 130 and hearing device 120 without any user action and/or authentication due to the first pairing relationship that was previously established between user interface device 130 and hearing device 120. Once the communication channel between user interface device 130 and hearing device 120 is established based on the first pairing relationship, a user may interact with hearing device 120 via user interface device 130. For example, the user may provide user input via input components 310 (e.g., keypad, touchscreen, etc.) of user interface device 130.

At operation 706, user interface device 130 may receive user input from the user via the user interface of user interface device 130. At operation 708, user interface device 130 may transmit the user input to hearing device 120 via the communication channel between user interface device 130 and hearing device 120. Hearing device 120 may then use the user input received from user interface device 130 to perform various operations. For example, hearing device 120 may use the user input to authenticate a second pairing relationship between hearing device 120 and computing device 140 that is distinct from user interface device 130 as described herein. In some embodiments, hearing device 120 may also transmit its output to user interface device 130 via the communication channel between user interface device 130 and hearing device 120. User interface device 130 may receive the output from hearing device 120 via the communication channel and provide the output to the user via output components 312 (e.g., display screen, audio speaker, etc.) of user interface device 130 as described herein.

As described herein, to prevent attackers from interfering with the second pairing relationship to connect a malicious computing device with hearing device 120, the communication channel between user interface device 130 and hearing device 120 through which data being used to establish the second pairing relationship is communicated may need to be secure. Therefore, the first pairing relationship based on which the communication channel between user interface device 130 and hearing device 120 is established may need to be formed in a secure manner. In some embodiments, user interface device 130 may securely establish the first pairing relationship between user interface device 130 and hearing device 120 in various manners that are similar to the manners in which hearing device 120 may securely establish the first pairing relationship between hearing device 120 and user interface device 130 as described herein.

In some embodiments, user interface device 130 may securely establish the first pairing relationship between user interface device 130 and hearing device 120 based on data authentication. In some embodiments, to securely establish the first pairing relationship between user interface device 130 and hearing device 120 based on data authentication, user interface device 130 may use one or more embodiments that are similar to the one or more embodiments that hearing device 120 may use to securely establish the first pairing relationship between hearing device 120 and user interface device 130 based on data authentication as described herein.

For example, user interface device 130 and hearing device 120 may temporarily establish an authentication channel between user interface device 130 and hearing device 120 and exchange authentication data (e.g., passkey, passcode, PIN, etc.) via the authentication channel. As described herein, the authentication channel may be a secured channel that cannot be interfered by an attacker and may be referred to herein as an out-of-band channel. For example, the authentication channel may be a short-range communication channel configured to transmit or receive data over a relatively short distance (e.g., a few centimeters or a few inches). Due to the short range of the authentication channel between hearing device 120 and user interface device 130, an attacker (e.g., a man-in-the-middle, a machine-in-the-middle, etc.) may need to be present proximate to hearing device 120 and user interface device 130 in order to interfere with the first pairing relationship between them, and therefore the attacker can be easily detected by the user.

As an example of the authentication channel, user interface device 130 may be implemented by a charging device of hearing device 120 as described herein. The charging device may be configured to provide power to hearing device 120 via a power charging channel. The power charging channel may be established and maintained between the charging device and hearing device 120 when the charging device and hearing device 120 are connected via one or more wired charging contacts or wireless charging loop. In some embodiments, the power charging channel may be used as the authentication channel to exchange the authentication data between user interface device 130 and hearing device 120 as described herein. For example, the authentication data may be integrated into signals being transmitted via the power charging channel, and thus the authentication data may be exchanged between the charging device that implements user interface device 130 and hearing device 120.

In some embodiments, user interface device 130 and hearing device 120 may authenticate the first pairing relationship between user interface device 130 and hearing device 120 based on the authentication data. For example, user interface device 130 may compare the authentication data received from hearing device 120 via the authentication channel with the authentication data maintained at user interface device 130. As described herein, the authentication data maintained at user interface device 130 may be authentication data (e.g., passkey, passcode, PIN, etc.) associated with hearing device 120 that is provided to user interface device 130 when user interface device 130 is manufactured and/or configured. If the authentication data received from hearing device 120 matches the authentication data maintained at user interface device 130, user interface device 130 may determine that the first pairing relationship between user interface device 130 and hearing device 120 is legitimate, and therefore authorize the first pairing relationship between user interface device 130 and hearing device 120. In some embodiments, in response to the first pairing relationship between user interface device 130 and hearing device 120 being authorized by one or both of user interface device 130 and hearing device 120, user interface device 130 and hearing device 120 may establish the first pairing relationship between user interface device 130 and hearing device 120 as described herein.

Further detailed implementations of this example embodiment are similar to the corresponding embodiment performed by hearing device 120 to establish the first pairing relationship based on data authentication previously described herein, and therefore such detailed descriptions are not repeated here for brevity.

In some embodiments, the first pairing relationship between user interface device 130 and hearing device 120 may be established without data authentication. In this case, as the data transmitted via the communication channel based on the first pairing relationship is used to establish the second pairing relationship, the second pairing relationship between hearing device 120 and computing device 140 may need to be sufficiently separated from the first pairing relationship between hearing device 120 and user interface device 130 in terms of time (e.g., timestamp) and/or location (e.g., geographical location determined by GPS service or other location service) as described herein. In some embodiments, user interface device 130, instead of hearing device 120, may determine the separation between the first pairing relationship and the second pairing relationship in terms of time and/or location.

In some embodiments, user interface device 130 may determine a first timestamp associated with the first pairing relationship between user interface device 130 and hearing device 120. For example, user interface device 130 may determine the first timestamp to be a time at which the first pairing relationship between user interface device 130 and hearing device 120 is requested or established. In some embodiments, user interface device 130 may determine a second timestamp associated with the second pairing relationship between hearing device 120 and computing device 140. For example, user interface device 130 may determine the second timestamp to be a time at which user interface device 130 is used to request the second pairing relationship between hearing device 120 and computing device 140.

In some embodiments, user interface device 130 may transmit to hearing device 120, via the communication channel between user interface device 130 and hearing device 120 that is established based on the first pairing relationship, the first timestamp associated with the first pairing relationship and the second timestamp associated with the second pairing relationship. Hearing device 120 may then compute a time difference between the first timestamp and the second timestamp, and determine whether the first pairing relationship between user interface device 130 and hearing device 120 and the second pairing relationship between hearing device 120 and computing device 140 are significantly separate from one another in terms of timestamp as previously described herein.

Additionally or alternatively, user interface device 130 may compute a time difference between the first timestamp associated with the first pairing relationship and the second timestamp associated with the second pairing relationship, and transmit the time difference to hearing device 120 via the communication channel between user interface device 130 and hearing device 120. Hearing device 120 may then evaluate the time difference between the first timestamp and the second timestamp, and determine whether the first pairing relationship between user interface device 130 and hearing device 120 and the second pairing relationship between hearing device 120 and computing device 140 are significantly separate from one another in terms of timestamp as previously described herein.

In some embodiments, instead of or in addition to determining the separation in terms of timestamp, user interface device 130 may determine the separation between the first pairing relationship and the second pairing relationship in terms of location.

In some embodiments, user interface device 130 may determine a first location associated with the first pairing relationship between user interface device 130 and hearing device 120. For example, user interface device 130 may determine the first location to be a location at which the first pairing relationship between user interface device 130 and hearing device 120 is requested or established. In some embodiments, user interface device 130 may determine a second location associated with the second pairing relationship between hearing device 120 and computing device 140. For example, user interface device 130 may determine the second location to be a location at which user interface device 130 is used to request the second pairing relationship between hearing device 120 and computing device 140.

In some embodiments, user interface device 130 may transmit to hearing device 120, via the communication channel between user interface device 130 and hearing device 120 that is established based on the first pairing relationship, the first location associated with the first pairing relationship and the second location associated with the second pairing relationship. Hearing device 120 may then compute a location difference between the first location and the second location, and determine whether the first pairing relationship between user interface device 130 and hearing device 120 and the second pairing relationship between hearing device 120 and computing device 140 are significantly separate from one another in terms of location as previously described herein.

Additionally or alternatively, user interface device 130 may compute a location difference between the first location associated with the first pairing relationship and the second location associated with the second pairing relationship, and transmit the location difference to hearing device 120 via the communication channel between user interface device 130 and hearing device 120. Hearing device 120 may then evaluate the location difference between the first location and the second location, and determine whether the first pairing relationship between user interface device 130 and hearing device 120 and the second pairing relationship between hearing device 120 and computing device 140 are significantly separate from one another in terms of location as previously described herein.

In some embodiments, user interface device 130 may not only determine and transmit to hearing device 120 time information (e.g., the first timestamp, the second timestamp, and/or the time difference between the first timestamp and the second timestamp) associated with the first pairing relationship and the second pairing relationship, but also determine and transmit to hearing device 120 location information (e.g., the first location, the second location, and/or the location difference between the first location and the second location) associated with the first pairing relationship and the second pairing relationship. Hearing device 120 may then compute and/or evaluate both the time difference between the first timestamp and the second timestamp and the location difference between the first location and the second location, and determine whether the first pairing relationship between user interface device 130 and hearing device 120 and the second pairing relationship between hearing device 120 and computing device 140 are significantly separate from one another both in terms of time and in terms of location as previously described herein.

As described herein, in response to the determining that the first pairing relationship between user interface device 130 and hearing device 120 and the second pairing relationship between hearing device 120 and computing device 140 are significantly separate from one another in terms of time and/or in terms of location, hearing device 120 may authorize the second pairing relationship between hearing device 120 and computing device 140, and therefore the second pairing relationship between hearing device 120 and computing device 140 may be established. Otherwise, hearing device 120 may reject the second pairing relationship between hearing device 120 and computing device 140, and therefore the second pairing relationship between hearing device 120 and computing device 140 may not be established.

Accordingly, hearing device 120 may be paired with computing device 140 using the user input that the user provides via user interface device 130 as described herein. In some embodiments, hearing device 120 may be paired not with computing device 140 but with a software application implemented on computing device 140. For example, hearing device 120 may be paired with a software application running on computing device 140 that is configured to monitor hearing data of the user collected by hearing device 120 and transmit the hearing data of the user to a predefined clinical facility.

In some examples, the operations described herein may be performed in a centralized manner or a distributed manner. For example, the operations to establish the first pairing relationship and the second pairing relationship described herein may be performed by a single computing device such as a centralized managing server. Alternatively, these operations may be collaboratively performed by various devices (e.g., hearing device 120, user interface device 130, etc.) as described herein. It should be understood that one or more operations performed by hearing device 120 may instead be performed by user interface device 130 and vice versa.

It should also be understood that the first pairing relationship (and the communication channel) between hearing device 120 and user interface device 130 may be referred to herein as the first pairing relationship (and the communication channel) between user interface device 130 and hearing device 120. Similarly, the second pairing relationship (and the communication channel) between hearing device 120 and computing device 140 may be referred to herein as the second pairing relationship (and the communication channel) between computing device 140 and hearing device 120.

As described herein, due to the first pairing relationship between hearing device 120 and user interface device 130 and the communication channel between hearing device 120 and user interface device 130 that is based on the first pairing relationship, the user may conveniently interact with hearing device 120 using user interface device 130. In some embodiments, instead of providing user interaction capabilities to hearing device 120 with user interface device 130, input/output components may be integrated into hearing device 120 to provide hearing device 120 with these user interaction capabilities. For example, hearing device 120 may include a keypad, a mini display, a touchscreen, etc., to receive user input from the user and/or display output to the user via these input/output components. In some embodiments, hearing device 120 may include an audio speaker and a microphone for the user to interact with hearing device 120 via voice communication. Other implementations to facilitate user interactions between the user and hearing device 120 are also possible and contemplated.

Figure 8:
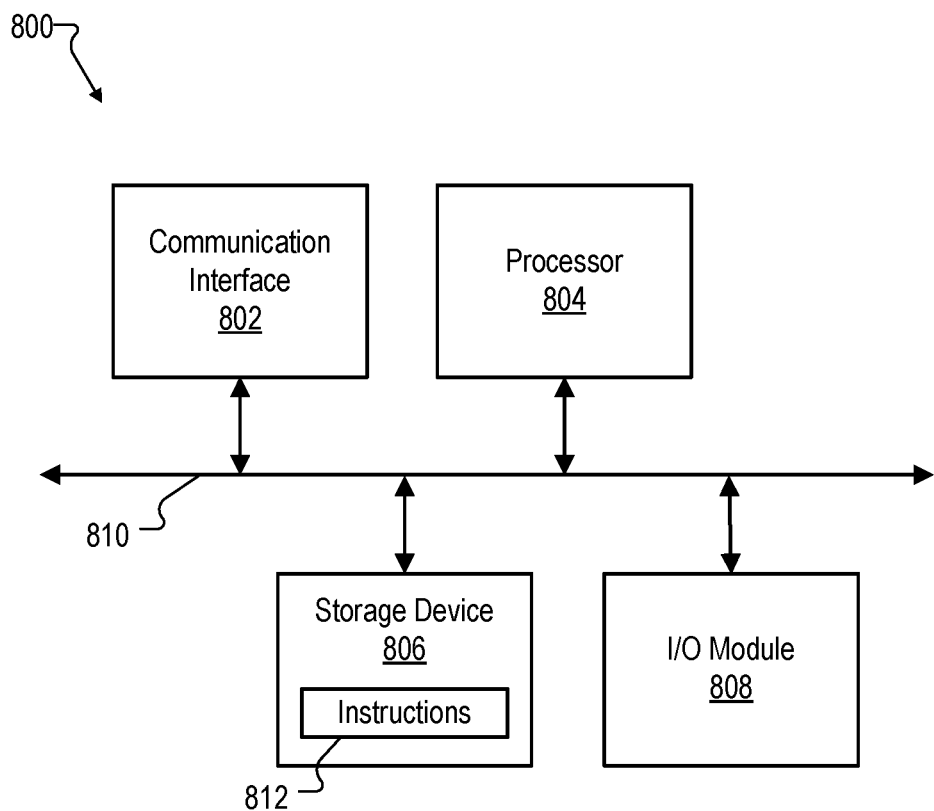
FIG. 8 illustrates an exemplary computing device.

FIG. 8 illustrates an exemplary computing device 800 that may be specifically configured to perform one or more of the processes described herein. Any of the systems and/or devices described herein may be implemented by computing device 800.

As shown in FIG. 8, computing device 800 may include a communication interface 802, a processor 804, a storage device 806, and an input/output ("I/O") module 808 communicatively connected one to another via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data and/or interpreting, executing, and/or directing execution of one or more of the instructions, processes, and/or operations described herein. Processor 804 may perform operations by executing computer-executable instructions 812 (e.g., an application, software, code, and/or other executable data instance) stored in storage device 806.

Storage device 806 may include one or more data storage media, devices, or configurations and may employ any type, form, and combination of data storage media and/or device. For example, storage device 806 may include, but is not limited to, any combination of the non-volatile media and/or volatile media described herein. Electronic data, including data described herein, may be temporarily and/or permanently stored in storage device 806. For example, data representative of computer-executable instructions 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A hearing device comprising:
a memory storing instructions; and
a processor communicatively coupled to the memory and configured to execute the instructions to:
establish a first pairing relationship between the hearing device and a user interface device;
receive, from the user interface device via a communication channel based on the first pairing relationship, user input provided by a user via a user interface of the user interface device; and
authenticate, based on the user input, a second pairing relationship between the hearing device and a computing device distinct from the user interface device, the authenticating comprising:
determining a first timestamp associated with the first pairing relationship between the hearing device and the user interface device;
determining a second timestamp associated with the second pairing relationship between the hearing device and the computing device;
determining that a time difference between the first timestamp associated with the first pairing relationship and the second timestamp associated with the second pairing relationship satisfies a time difference threshold, the time difference threshold being configurable by the user of the hearing device; and
authorizing, in response to the determining that the time difference between the first timestamp and the second timestamp satisfies the time difference threshold, the second pairing relationship between the hearing device and the computing device.

2. The hearing device of claim 1, wherein the establishing the first pairing relationship between the hearing device and the user interface device includes:
establishing an authentication channel between the hearing device and the user interface device;
exchanging authentication data between the hearing device and the user interface device via the authentication channel;
authorizing the first pairing relationship between the hearing device and the user interface device based on the authentication data; and
establishing, in response to the authorizing of the first pairing relationship, the first pairing relationship between the hearing device and the user interface device.

3. The hearing device of claim 2, wherein:
the user interface device is implemented by a charging device configured to provide power to the hearing device; and
the authentication channel includes a power charging channel established and maintained between the hearing device and the charging device when the hearing device and the charging device are connected to one another via one or more wired charging contacts or a wireless charging loop.

4. The hearing device of claim 1, wherein:
the time difference threshold is further based on an attribute of a pairing operation to establish the first pairing relationship between the hearing device and the user interface device.

5. The hearing device of claim 1, wherein the authenticating the second pairing relationship between the hearing device and the computing device further includes:
determining a first location associated with the first pairing relationship between the hearing device and the user interface device;
determining a second location associated with the second pairing relationship between the hearing device and the computing device; and
determining that a location difference between the first location associated with the first pairing relationship and the second location associated with the second pairing relationship satisfies a location difference threshold;
wherein the authorizing is further based on the determining that the location difference between the first location and the second location satisfies the location difference threshold.

6. The hearing device of claim 5, wherein:
the location difference threshold is predefined in a default configuration of the hearing device.

7. The hearing device of claim 5, wherein:
the location difference threshold is configurable by the user of the hearing device.

8. The hearing device of claim 5, wherein:
the location difference threshold is based on an attribute of a pairing operation to establish the first pairing relationship between the hearing device and the user interface device.

9. The hearing device of claim 1, wherein:
the first pairing relationship between the hearing device and the user interface device is based on a first communication protocol; and
the second pairing relationship between the hearing device and the computing device is based on a second communication protocol.

10. The hearing device of claim 9, wherein:
the first communication protocol is a Bluetooth Basic Rate/Enhanced Data Rate (BR/EDR) protocol, a Bluetooth Low Energy (LE) protocol, or a specialized protocol associated with the hearing device and the user interface device; and
the second communication protocol is the Bluetooth BR/EDR protocol, the Bluetooth LE protocol, or a specialized protocol associated with the hearing device and the computing device.

11. The hearing device of claim 9, wherein:
the first communication protocol is distinct from the second communication protocol.

12. A method comprising:
establishing, by a hearing device, a first pairing relationship between the hearing device and a user interface device;
receiving, by the hearing device and from the user interface device via a communication channel based on the first pairing relationship, user input provided by a user via a user interface of the user interface device; and
authenticating, by the hearing device based on the user input, a second pairing relationship between the hearing device and a computing device distinct from the user interface device, the authenticating comprising:
determining a first timestamp associated with the first pairing relationship between the hearing device and the user interface device;
determining a second timestamp associated with the second pairing relationship between the hearing device and the computing device;
determining that a time difference between the first timestamp associated with the first pairing relationship and the second timestamp associated with the second pairing relationship satisfies a time difference threshold, the time difference threshold being configurable by the user of the hearing device; and
authorizing, in response to the determining that the time difference between the first timestamp and the second timestamp satisfies the time difference threshold, the second pairing relationship between the hearing device and the computing device.

13. The method of claim 12, wherein the establishing the first pairing relationship between the hearing device and the user interface device includes:
establishing an authentication channel between the hearing device and the user interface device;
exchanging authentication data between the hearing device and the user interface device via the authentication channel;
authorizing the first pairing relationship between the hearing device and the user interface device based on the authentication data; and
establishing, in response to the authorizing of the first pairing relationship, the first pairing relationship between the hearing device and the user interface device.

14. The method of claim 13, wherein:
the user interface device is implemented by a charging device configured to provide power to the hearing device; and
the authentication channel includes a power charging channel established and maintained between the hearing device and the charging device when the hearing device and the charging device are connected to one another via one or more wired charging contacts or a wireless charging loop.

15. The method of claim 12, wherein:
the time difference threshold is further based on an attribute of a pairing operation to establish the first pairing relationship between the hearing device and the user interface device.

16. The method of claim 12, wherein the authenticating the second pairing relationship between the hearing device and the computing device further includes:
determining a first location associated with the first pairing relationship between the hearing device and the user interface device;
determining a second location associated with the second pairing relationship between the hearing device and the computing device; and
determining that a location difference between the first location associated with the first pairing relationship and the second location associated with the second pairing relationship satisfies a location difference threshold;
wherein the authorizing is further based on the determining that the location difference between the first location and the second location satisfies the location difference threshold.

17. The method of claim 16, wherein:
the location difference threshold is predefined in a default configuration of the hearing device.

18. The method of claim 16, wherein:
the location difference threshold is configurable by the user of the hearing device.

19. The method of claim 16, wherein:
the location difference threshold is based on an attribute of a pairing operation to establish the first pairing relationship between the hearing device and the user interface device.

20. The method of claim 12, wherein:
the first pairing relationship between the hearing device and the user interface device is based on a first communication protocol; and
the second pairing relationship between the hearing device and the computing device is based on a second communication protocol.

* * * * *